Aug. 27, 1963 K. L. CIANCHETTE ETAL 3,101,968
GRAPPLES
Filed Sept. 12, 1962
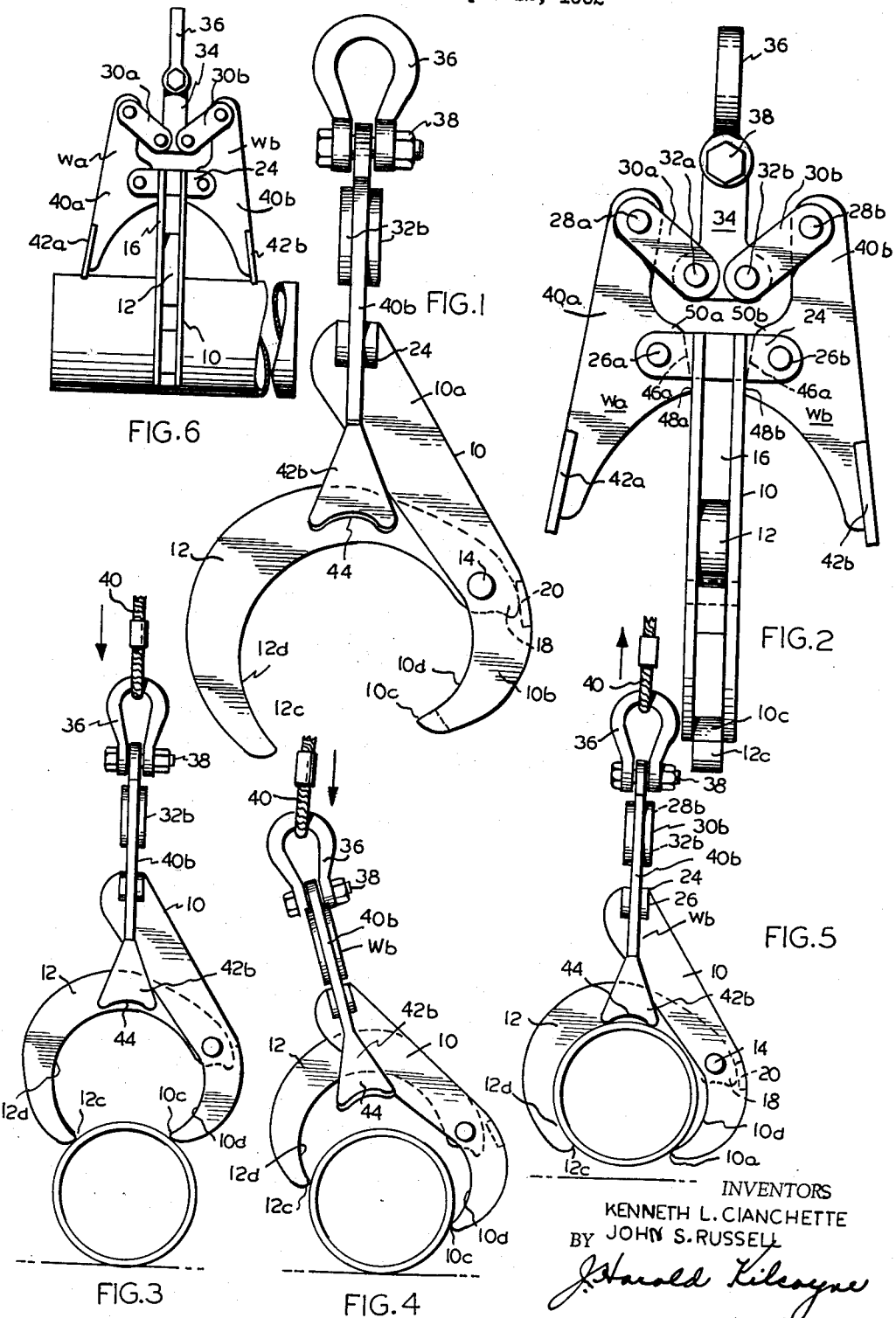
INVENTORS
KENNETH L. CIANCHETTE
BY JOHN S. RUSSELL
ATTORNEY 3,101,968
GRAPPLES
Kenneth L. Cianchette and John S. Russell, Pittsfield, Maine, assignors to Cianbro Mfg. Corp., Pittsfield, Maine, a corporation of Maine
Filed Sept. 12, 1962, Ser. No. 223,140
8 Claims. (Cl. 294—104)

This invention relates to improvements in grapples and, although not limited thereto, will be hereinafter described as a pipe grab for handling lengths of pipe incident to the laying of said pipe in a ditch in the ground.

Presently, the generally accepted procedure of grappling pipe to lift it from a stacked pile thereof or from the ground and then to lower it into a ditch is to wrap the pipe with a choker or sling of rope or chain, with some lesser use being also made of grapples of the simple pipe-tong type. However, these sling devices and the conventional pipe tongs are neither safe nor efficient in use, since if one end of the pipe lowers with respect to the other end the pipe is very likely to slide out from the sling or to disengage from the tongs consequent to the asymmetric loading thereof.

Another objectionable feature of the prior pipe grappling means, particularly of the sling type, is that they require space under the pipe or that the pipe be lifted in order to place and finally to remove the sling following laying of the pipe in the trench or ditch. Obviously, lifting of the pipe for the purpose of removing the sling after it has been once laid in place in the ditch is highly undesirable, since such may dislodge the pipe and necessitate its re-positioning and re-alignment.

Stated broadly, an object of the present invention is the provision of a grapple designed especially but not exclusively for use as a pipe grab, which overcomes in simple yet safe and efficient manner the aforementioned objections to the prior sling and pipe-tong type devices for lifting and handling pipe incident to the laying thereof in a ditch, for example.

A more particular object of the invention is the provision of a so-called pipe grab of simple, compact construction and which, more importantly, has the capability of effecting a positive, non-slip grip on the pipe, even when the latter is being dragged along the ground or is lifted by one end.

Another object of the invention is the provision of a pipe grab having the capability of automatically engaging and gripping the pipe when lowered thereon and which can be readily removed from the pipe without disturbing the position thereof.

Still another object of the invention is the provision of a pipe grab as aforesaid, which possesses the further practical advantage that it requires neither space under nor lifting of the pipe in engaging therewith or in disengaging therefrom.

Yet another object of the invention is the provision of a pipe grab as aforesaid which is further constructed and arranged so as to be capable of maintaining its effective engaged or operating position on the pipe, in which it is disposed in a plane extending substantially normal to the pipe axis, against forces tending to turn or cock it sidewise from said plane, as for example, a pull force applied in a direction to pull the pipe longitudinally along the ground or a lifting force applied to one end of the pipe as results in the other end lowering with respect to said one gripped end.

A still further object of the invention is the provision, in a pipe grab comprising two basic pivotally interconnected hook and claw members conjointly operative, when lowered onto a pipe lying is exposed position in a pile or on the ground to grip the pipe in an operating plane extending transversely thereof, of means lowerable onto the upper peripheral portion of said pipe at points thereof disposed to the opposite sides of said plane responsive to upward pull applied to the grab for preventing relative cocking between pipe grab and the so grappled pipe likely to occur when the pipe is grabbed to one or the other sides of its middle-length portion.

The above and other objects and advantages of an improved grapple or so-called pipe grab according to the invention will be seen from the following detailed description and accompanying drawing illustrative thereof, wherein—

FIG. 1 is a side elevation and FIG. 2 a front (right side as seen in FIG. 1) elevation of a grapple or pipe-grab device as herein proposed, FIG. 1 further depicting the normal relation of the parts making up the same;

FIGS. 3 and 4 are views illustrating the manner in which such a pipe grab is adapted to automatically open and grapple a pipe incident to its being lowered onto the pipe;

FIG. 5 is a view illustrating the action of a pipe grab and its stabilizer pads according to the invention in raising a pipe; and FIG. 6 is a broken-away view illustrating the action of the stabilizer assemblies in maintaining the grapple or pipe grab of the invention against cocking with respect to the pipe, even though secured to an end thereof rather than to its generally central-length portion.

Referring to the drawings in greater detail, a grapple or so-called pipe grap according to the invention, and which will be hereinafter for convenience referred to simply as a pipe grab, comprises two main pipe-gripping parts, namely, a hook member 10 and a claw member 12, which are pivotally connected to one another by a pivot pin or bolt 14. The hook member 10 is roughly J-shaped, having a relatively elongated and straightway extending body portion 10a terminating at its lower end in an arcuate jaw portion 10b which curves laterally away from said body portion, and in turn ends in a gripping point 10c. Since said hook member 10 carries the companion claw member 12 which is movable with respect thereto, said hook member may be considered as the fixed member of the pair.

The claw member 12, which as above indicated constitutes the movable member of the device, is shown to be roughly sickle-shaped in configuration and disposed to open downwardly, and it is moreover pivotally connected near its one end, by the aforesaid pivot 14, to a point on the hook member 10 which is disposed at about the junction of its straightway-extending body and lower curved jaw portions 10a, 10b, respectively. In the normal or lowermost position of said claw member 12, to which it is biased by its own weight, it curves upwardly-laterally away from said hook member 10 and thence downwardly-inwardly towards the latter, finally terminating in a gripping point 12c, which is companion to the aforesaid gripping point 10c of the hook member, and is spaced therefrom a distance which is appreciably less than the diameter of the pipe to be gripped by the device.

As best seen in FIG. 2, the hook member 10 is of slotted or spaced-wall construction throughout the greater extent of its length, the width of the resulting slot 16 being dimensioned so as to accommodate the claw member 12, which is thus capable of at least partially retracting within said hook member when it is swung upwardly from its aforesaid normal position to, for example, its substantially full-raised position shown in FIG. 4. As further seen in FIG. 1, the aforesaid normal or lowermost position of the pivoted claw member 12 is fixed by the engagement of a stop lug or nose 18 formed on the pivoted end of said member and which projects past the pivot pin 14, with an abutment surface 20 provided as by a fixed cross-bar extending between the spaced walls of the hook member.

According to the invention, the curved inner edge portions 10d and 12d of the hook and jaw members adjacent at least their free ends or gripping points 10c, 12c, respectively, are formed along spaced arcs which have common radius roughly corresponding to that of the pipe being handled. However, rather than said curved inner edge portions 10d and 12d extending along true arcs of radius corresponding more or less exactly to that of pipe radius, it is preferred that they are instead somewhat relieved or cut back from said true arcs immediately adjacent the gripping points 10c and 12c, respectively, such resulting, as indicated in FIG. 5, in the gripping points 10c, 12c making definite point contact with the outer peripheral surface of a pipe received in the aforesaid pipe-receiving opening. Above said edge portions 10d and 12d, the relief or cut-back of the inner edges of both hook and claw members is substantial, thus to insure that the pipe received in the pipe-receiving opening defined by the inner edges of said members will be positively engaged at points on its upper periphery by the pads of the stabilizer assemblies to be described, rather than by the upper inner edge portions of said members.

As best seen in FIGS. 1 and 2, the hook member 10, rather than being connected directly to a hoist-line as is conventional, is instead affixed at its upper end to spaced cross arms defining a rigid cross head 24, and interposed between and pivotally connected to the outer ends of said arms as by means of pivot pins 26a, 26b are a pair of oppositely acting, swinging stabilizer or wing assemblies generally designated Wa and Wb. Said wing assemblies are pivotally connected at their upper ends as by pivot pins 28a, 28b to inwardly-downwardly inclined top links 30a, 30b in turn connected by means of laterally spaced pivot pins 32a, 32b to the lower end of a central, vertically disposed link connector 34, to the upper end of which a shackle 36 is connected as by a cross bolt 38. A hoist-line 40 shown in FIGS. 3–5, and extending to the winch of a hoist or crane (not shown) is connected to the shackle 36, and thus the grab may be lowered bodily onto a length of pipe to effect grappling and subsequent lifting thereof.

With the construction and linkage system so far described, it will be appreciated that with the grab suspended and free of pipe, for example, when it is being lowered onto a length of pipe and prior to engaging same, the weight of the grab parts will cause maximum permissible vertical extension between shackle 36 and its link connector 34 and the hook member 10. However, when the grab lowers onto a pipe to the extent that at least some of its weight is taken by said pipe, the hoist-line slackens, whereupon the shackle and its link connector and said hook member may move towards one another a limited amount. Then, when an upward pull is applied to the grab by a similarly upward pull on the hoist-line, the shackle and its connector link and the hook member 10 will tend to move to their maximum position of relative separation, as permitted by extension of the linkage system.

The aforesaid movement of link connector 34 relative to hook member 10 is utilized according to the invention in effecting swinging movement in opposite directions of the aforesaid wing assemblies, Wa, Wb, which, as best seen in FIGS. 2 and 6, comprise aligned, vertically disposed generally triangular wing plates 40a, 40b, having intermediate, inwardly projecting portions functioning as hubs in which the aforesaid pivot pins 26a, 26b have bearing and in whose upper apical extremities the aforesaid pivot pins 28a, 28b have bearing. Said wing plates 40a, 40b extend in downwardly divergent relation with respect to one another, and at their lower apical ends mount transversely disposed pipe-engaging pads 42a, 42b shown to have general upright equilateral triangular configuration, and base lines that are downwardly concave, as at 44, and extending along an arc which at least generally conforms to the curvature of the upper peripheral portion of the pipe being handled.

Referring to FIG. 2 in particular, it will be noted that the aforesaid hub portions of the wing plates 40a, 40b are in part defined along their adjacent sides by straightway extending edge portions 46a, 46b terminating at their lower ends in well defined corners 48a, 48b, and at their upper ends in similar corners 50a, 50b. According to the invention, engagement of said corners with the side surfaces of the hook member 10 to which in effect the wing plates 40a, 40b are pivotally connected, determines the limits of swinging or rocking movement of such wing plates in both directions, and thus the limits of extension and contraction of the linkage system interposed between shackle 36 and hook member 10. In explanation, when the wing-plate lower corners 48a, 48b abut the side surfaces of the hook member as in FIG. 2, further swinging movement of the wing plates in directions as to cause their lower or pad-carrying ends to approach one another is positively prevented, and thus such abutment determines the maximum permissible extension of the linkage system and thereby the greatest separation of shackle 36 and hook member 10. Conversely, when the wing-plate upper corners 50a, 50b abut the side surfaces of the hook member during the course of movement of the wing plates in directions as causes spreading of their pad-carrying lower ends, further swinging movement of said wing plates is positively stopped, and accordingly such abutment determines the maximum permissible contraction of the linkage system and thereby minimum spacing of the shackle and hook member.

By design of the parts, the aforesaid movement imparted to the pad members 42a, 42b is along vertical arcs struck from centers corresponding to the swing axes of the wing plates 40a, 40b, i.e. the axes of pivot pins 26a, 26b. Thus, the wing pads 42a, 42b have a relatively large component of vertical movement, even though the swinging motion of the wing plates is relatively small. Also, as analysis of FIG. 1 will show, the lowermost position of the wing pads is such that their pipe-engaging lower edges 44 is somewhat above the highest inner edge portion of the claw member 12 when the latter is in its lowermost or stop position, as determined by engagement of its stop lug 18 with the aforesaid stop surface 20 provided on the hook member 10. This arrangement provides that upon the grab lowering onto a pipe of diameter as to cause even limited opening of the claw member 12 relative to hook member 10, the wing pads 42a, 42b will bear along their bottom edges on the upper peripheral portion of said pipe at points spaced axially to opposite sides of the plane of operation of the grab proper, and thus will prevent cocking of the grab with respect to the pipe, even though it grips the pipe to one side of its middle length position, or near one end thereof, as in FIG. 6. With larger sizes of pipes within the grappling range for which a particular size grab is designed, the wing pads will lower automatically in response to upward pull on the hoist-line against the upper peripheral portion of the pipe grappled between the hook and claw members 10, 12, and in effect force the same against the gripping points 10c, 12c thereof. Stated otherwise, the wing assemblies function in a manner similar to stabilizing outriggers which lower automatically onto the pipe being held or grappled by the grab proper, thus to stabilize the grab and maintain it in its most effective operative plane relative to the pipe being moved or lifted, which, of course, is that extending transversely across the pipe axis.

While the operation of the above described grapple applied as a pipe grab will, it is believed, be clear to those skilled in the art, it is briefly summarized as follows, with reference being had to FIGS. 3, 4 and 5 in particular:

To pick up a pipe lying on the ground, for example, the grab is lowered thereagainst by corresponding lowering of the hoist or crane apparatus to which the device is secured, the grab being of course positioned relatively to the pipe so that the lower ends of said hook and claw members 10 and 12 will be sure to move on to the generally upper periphery of the pipe. Initial engagement of the movable claw member 12 with the pipe causes said member to swing in upwardly opening direction with respect to the other or relatively fixed hook member 10, which later tends to ride sidewardly down the pipe, as shown in FIG. 4, to its final gripping position.

When the hook and claw members have opened relatively to one another an amount enabling them to receive the pipe between their free-end points 10c, 12c, the raised claw member 12 then lowers by gravity to its closed position best shown in FIG. 5, in which said members acting together enclose the pipe throughout the major arc of its circumference. Upon the hoist-line being slacked by the hook and claw members making the first engagement with the pipe, the wing assemblies Wa and Wb swing outwardly and results in the pads 42a, 42b moving to their raised position. When now a lifting force is applied to the device through the hoist-line, the hook and claw members 10, 12 are maintained in their closed pipe-enclosing position by the overcenter action of the pivoted claw member 12, which latter insures said member always tending to return to its normal closed (lowered) position when free to do so. This lifting force also acts to extend the linkage system interposed between hoist-line and hook member, as explained in the foregoing, which causes the wing assemblies Wa and Wb to swing in a direction as effects lowering of the outrigger or stabilizing pads into firm engagement with the upper periphery of the pipe at points spaced axially to opposite sides of the grab proper, thus forcing the pipe more firmly into engagement with the gripping points 10c, 12c of the hook and claw members. Such, of course, results in the pipe being firmly held at two spaced points in the same transverse plane of the pipe on its under periphery and at two additional points on its upper periphery, which latter are spaced axially to opposite sides of the plane of said first two points.

Hence, said wing assemblies and their stabilizing pads 42a, 42b function to prevent any cocking or angling of the device out of its operating plane even though it may have been engaged with one end of the pipe, as is likely to cause the other end of the pipe to lower with respect to the gripped end and thereupon to disengage from the pipe grab when a lifting force is applied thereto. Since the wing assemblies maintain the device in its operating plane in which it cannot cock or move sidewardly out of said plane, the danger of the pipe disengaging from the grapple is substantially overcome.

When lowering of the pipe into a ditch or trench has been effected, a pipe grab as aforesaid may be readily disconnected therefrom, simply by slacking the hoist-line and manually actuating the movable claw member 12 to its raised or broken-line position. Such disengagement may be effected without disturbing the position of the pipe within the ditch and hence without any requirement of re-aligning the pipe following disengagement of the grab.

It is contemplated that a grapple or pipe grab according to the invention will be made up in various sizes according to pipe sizes, with each size of grab being capable of handling its size of pipe which may vary ¾" in outside diameter. Illustratively, pipe grabs of the invention will be made up in sizes ranging from 4" I.D. to 30" I.D., but of course may be made to any other size desired. In explanation of the aforesaid ¾" variation within a pipe size, such is usually that occurring in the same size pipe, depending on whether it is made of either cast iron or steel.

Without further analysis, it will be appreciated that a grapple or so-called pipe grab according to the present invention, although of compact and simple construction, offers a positive grip on a pipe engaged thereby, which is readily maintained even when the pipe is dragged along the ground or is being lifted by one end. A pipe grab according to the invention also has the advantage that it can make its own engagement with pipe lying on the ground, as opposed to the sling method of attachment which requires space under the pipe. Similarly, a pipe grab as aforesaid may be readily removed from the pipe which it has lowered into a ditch, without disturbing the final position of the pipe within the trench.

As many changes could be made in carrying out the above description or shown in the accompanying drawing invention, it is intended that all matter contained in the above description or shown in the accompanying drawing shall be interpreted as illustrative and not in a limiting sense.

We claim:

1. A pipe grab of the character described comprising pivotally connected hook and claw members, said hook member having a substantially straightway extending body portion merging at its lower end into a laterally curved portion terminating in a gripping point, the claw member being substantially sickle-shaped and arranged with its opening downwardly disposed and being pivoted at its one end to the hook member at approximately the junction of its body and curved lower end portion and terminating at its other end in a gripping point and being biased by gravity to a normal position in which its said gripping point is spaced from the gripping point of the hook member a distance less than the diameter of the pipe to be grappled, a hoist-line operatively connected to the upper end of the hook member, a vertically extensible and contractible linkage system interposed between said hoist-line and said hook member, and means responsive to extension of said linkage system for imparting downward stabilizing pressure on a pipe engaged between the hook and claw members at points which are spaced to opposite sides of the operating plane of said members.

2. A pipe grab according to claim 1, wherein said last-named means comprises wing assemblies carried by said hook member and extending to opposite sides thereof and including pipe-engaging pads having a vertical component of motion from corresponding inactive positions to pipe engaging and pressure applying positions.

3. A pipe grab according to claim 1, wherein said linkage system includes a cross head affixed to and extending across the top and in a plane transverse to that of the operating plane of said hook member, spaced apart aligned members pivotally connected to the ends of the cross head for swinging movement in the plane thereof, said aligned members extending above the hook member, a connector link extending downwardly into the space between the upper ends of said aligned members, top links pivotally connected to and extending between said upper ends and the lower ends of said connector link, and a shackle connected to the upper end of said connector link to which said hoist-line is attached.

4. A pipe grab according to claim 3, wherein said aligned members extend downwardly beyond their points of pivotal connection with the cross head and mount transversely extending pressure pads at their lower ends which are adapted to move downwardly into engagement with the upper periphery of said pipe responsive to extension of said linkage system.

5. A pipe grab of the character described, comprising pivotally connected pipe grappling members adapted upon lowering onto a pipe to be grappled to open with respect to one another and then to close by gravity about said pipe, a hoist-line operatively connected to at least one of said members for lowering said members onto said pipe and thereupon hoisting the grappled pipe, means operatively connected to said members for engaging the upper periphery of the pipe at points spaced to opposite sides of the operating plane of said pipe grab, and means for lowering said last means from an inactive position above said pipe to an active, pipe engaging position responsive to upward pull on said hoist-line.

6. A pipe grab according to claim 5, wherein said pipe engaging means comprises pressure pads disposed transversely of the pipe and said last means comprises an extensible and contractible linkage system interposed between at least said one pipe-grappling member and hoist-line and being extensible when pull is applied to said hoist-line, and means interconnecting said linkage system and said pressure pads in such manner that extension of said linkage system effects lowering of said pads into engagement with the grappled pipe.

7. A pipe grab according to claim 5, wherein said pipe engaging means comprises pressure pads mounted on the lower ends of spaced apart, aligned wing members operative in a plane normal to that of the operating plane of the grab and said last means comprises a vertically extensible and contractible linkage system interposed between at least said one pipe-grappling member and hoist-line and being extensible when pull is applied to the hoist-line, said system including said wing members which are pivotally connected intermediate their ends to opposite sides of the upper end of said one pipe grappling member and at their upper ends to shackle means extending into the space between the upper ends of the wing members.

8. A pipe grab according to claim 7, wherein said wing members intermediate their ends and said one grappling member have coacting means for limiting the pivotal movement of the wing members and corresponding motion of the pressure pads in both directions.

References Cited in the file of this patent
UNITED STATES PATENTS

| | | |
|---|---|---|
| 2,665,162 | Moore | Jan. 5, 1954 |
| 2,692,159 | Croswell | Oct. 19, 1954 |
| 2,915,333 | Koenig | Dec. 1, 1959 |
| 3,055,692 | Kausche | Sept. 25, 1962 |